United States Patent
Peterson

(10) Patent No.: US 12,152,688 B2
(45) Date of Patent: Nov. 26, 2024

(54) BI-STABLE SOLENOID DEVICE, MOVING MAGNET ACTUATOR, VALVE AND METHOD FOR OPERATING THE BI-STABLE SOLENOID DEVICE

(71) Applicant: ETO MAGNETIC GmbH, Stockach (DE)

(72) Inventor: Matthew Peterson, Ada, MI (US)

(73) Assignee: ETO MAGNETIC GmbH, Stockach (DE)

( * ) Notice: Subject to any disclaimer, the term of this patent is extended or adjusted under 35 U.S.C. 154(b) by 70 days.

(21) Appl. No.: 18/059,635

(22) Filed: Nov. 29, 2022

(65) Prior Publication Data
US 2024/0175515 A1  May 30, 2024

(51) Int. Cl.
*F16K 31/06* (2006.01)
*F16K 47/00* (2006.01)
*H01F 7/122* (2006.01)
*H01F 7/16* (2006.01)

(52) U.S. Cl.
CPC ...... *F16K 31/0696* (2013.01); *F16K 47/0111* (2021.08); *H01F 7/122* (2013.01); *H01F 7/1615* (2013.01)

(58) Field of Classification Search
CPC .. F16K 31/0696; F16K 47/0111; H01F 7/122; H01F 7/1615
USPC ........................ 251/54, 65, 129.16
See application file for complete search history.

(56) References Cited

U.S. PATENT DOCUMENTS

| | | | |
|---|---|---|---|
| 4,794,890 A * | 1/1989 | Richeson, Jr. ............ | F01L 9/20 123/90.11 |
| 4,831,973 A | 5/1989 | Richeson, Jr. | |
| 4,984,541 A | 1/1991 | Kawamura | |
| 5,832,883 A * | 11/1998 | Bae ........................... | F01L 9/20 123/90.11 |
| 6,076,490 A * | 6/2000 | Esch ......................... | F01L 9/20 123/90.11 |
| 6,592,095 B2 * | 7/2003 | Kabasin .............. | F16K 31/0679 251/129.01 |
| 6,739,293 B2 * | 5/2004 | Turner ..................... | F01L 9/10 251/30.01 |
| 6,817,592 B2 * | 11/2004 | Mianzo ..................... | F01L 9/20 251/48 |
| 6,896,236 B2 * | 5/2005 | Wang ..................... | F16K 31/383 251/30.01 |
| 7,458,345 B2 * | 12/2008 | Winstead ........... | F02D 41/0002 123/90.11 |

(Continued)

FOREIGN PATENT DOCUMENTS

| | | |
|---|---|---|
| DE | 102018220999 A1 | 6/2020 |
| DE | 102019215208 A1 | 4/2021 |

OTHER PUBLICATIONS

International Search Report of the International Searching Authority mailed Feb. 19, 2024 for the corresponding International Application No. PCT/EP2023/083371.

*Primary Examiner* — John Bastianelli
(74) *Attorney, Agent, or Firm* — Posz Law Group, PLC

(57) ABSTRACT

A bi-stable solenoid device is proposed, comprising an armature, which is linearly movable between two opposite end stops and comprising a damping unit, which is in communication with the armature and which is configured to dampen and/or to prevent an impact of the armature on at least one of the end stops by a compression and/or an expansion of a gas volume.

12 Claims, 2 Drawing Sheets

(56) References Cited

U.S. PATENT DOCUMENTS

Figure 1:
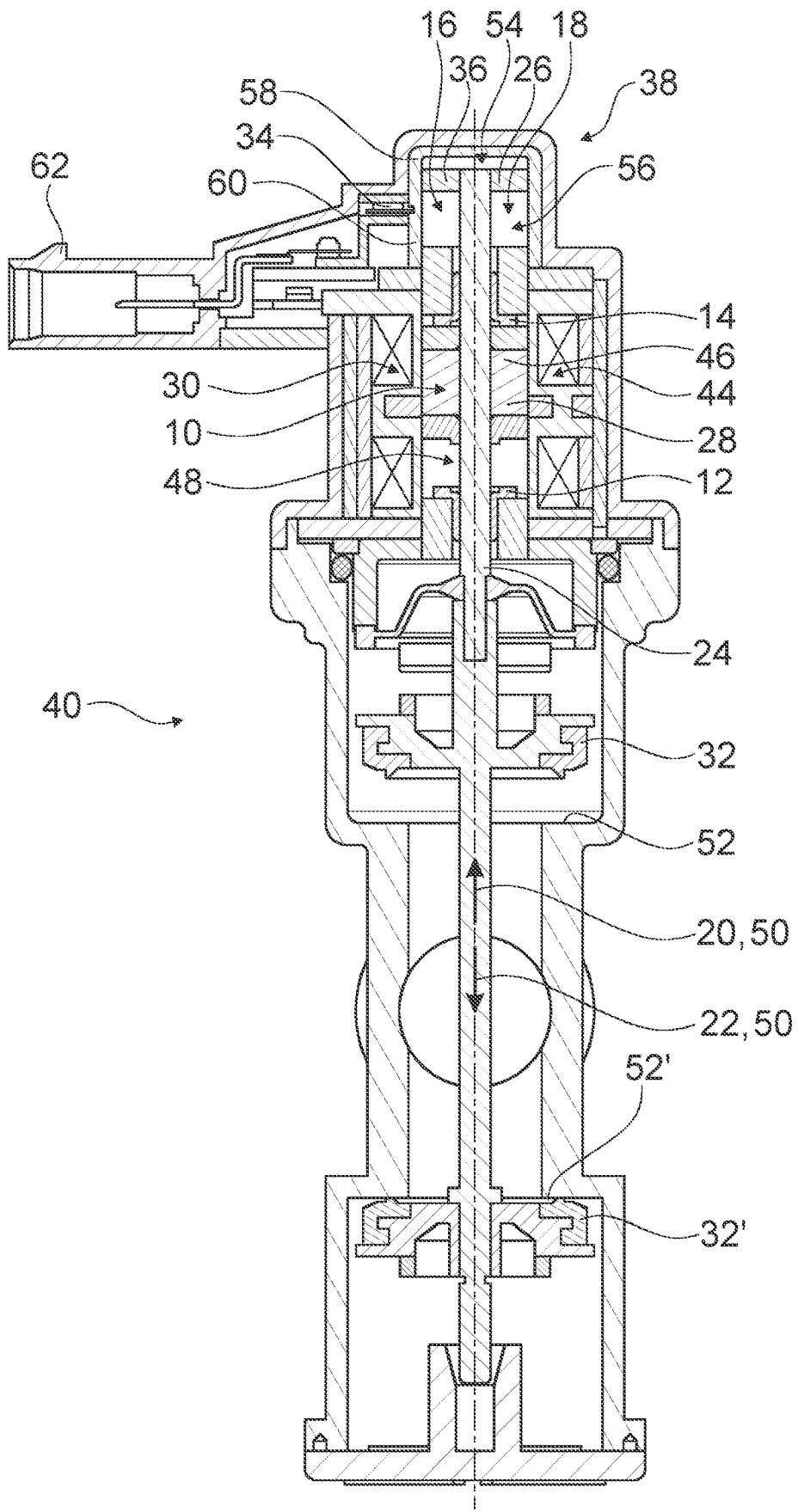

| | | | |
|---|---|---|---|
| 10,203,045 B2 | 2/2019 | Schieweck et al. | |
| 2002/0177237 A1* | 11/2002 | Shvets | F16K 37/0041 |
| | | | 436/180 |
| 2003/0196615 A1 | 10/2003 | Asano et al. | |
| 2009/0001305 A1* | 1/2009 | Cook | F16F 9/466 |
| | | | 29/890.12 |
| 2013/0319535 A1* | 12/2013 | Boger | G05D 16/2097 |
| | | | 137/487.5 |

\* cited by examiner

BI-STABLE SOLENOID DEVICE, MOVING MAGNET ACTUATOR, VALVE AND METHOD FOR OPERATING THE BI-STABLE SOLENOID DEVICE

STATE OF THE ART

The invention relates to a bi-stable solenoid device, a moving magnet actuator, a valve and a method for operating the bi-stable solenoid device.

From the state of the art, various types of bi-stable solenoid devices, comprising an armature, which is linearly movable between two opposite end stops are known. Often, the armatures of those devices are at least partly covered with a flexible cover to dampen an impact on an end stop of the device.

The objective of the invention is in particular to provide a device with advantageous properties regarding an operation, in particular concerning an operation monitoring and/or a longevity, of the device. The objective is achieved, according to the invention, by the features of the independent claims while advantageous implementations and further developments of the invention may be gathered from the subordinate claims.

ADVANTAGES OF THE INVENTION

The invention pertains to a bi-stable solenoid device, in particular a bi-stable solenoid valve device, advantageously to a bi-stable latching valve device, comprising an armature, which is linearly movable between two opposite end stops.

It is proposed that the bi-stable solenoid device comprises a damping unit, which is in communication with the armature and which is configured to dampen and/or to prevent an impact of the armature on at least one of the end stops, preferably on both end stops, by a compression and/or an expansion of a gas volume, in particular of a gas, for example air or nitrogen or else, within the gas volume. By this design, advantageous characteristics regarding a longevity and/or a structural integrity of the bi-stable solenoid device can advantageously be achieved. Advantageously, impulse loads impacting parts of the bi-stable solenoid device like a core of the bi-stable solenoid device or surfaces of the bi-stable solenoid device surrounding the core can be reduced. In particular the permanent magnets of a bi-stable solenoid device that is implemented as a moving magnet actuator are typically made from a relatively brittle material, which is sensitive to high impulse loads and thus can advantageously be protected by the proposed invention. Furthermore, a reduction of impulse loads can advantageously protect the structural integrity of the bi-stable solenoid device, for example by keeping core ends of the core aligned and in place. Moreover, by the proposed damping unit, a noise reduction can be achieved, which potentially can lead to an increased user friendliness and/or user satisfaction. In particular it may advantageously be possible to substantially completely eliminate impact noises/hammering noises/clicking noises of the bi-stable solenoid device.

A solenoid device is in particular to be understood as a device that converts electrical energy to mechanical energy, using an electromagnet, which can be formed from a coil of wire. In particular, the solenoid device is configured to create a magnetic field from electric current, and preferably uses the magnetic field to create linear motion on an armature. In particular, the term "configured" shall be understood to mean specially programmed, designed and/or equipped. By "configured" it is to be understood in particular that an object is intended for a certain function, that the object fulfills and/or executes this certain function in at least one application and/or operating state. A bi-stable solenoid device preferably provides a holding force in two (opposite) end positions without the need of an energy supply. In particular, the bi-stable solenoid device could be implemented as a latching valve device. Preferably the end stops of the bi-stable solenoid device represent two stable states/stable positions of the bi-stable solenoid device. The end stops are preferably implemented as mechanical end stops.

In particular, the armature and the damping unit are in a direct communication with each other, meaning that preferably no intermediary or separate force transfer elements exist which redirect the force from the armature to the damping unit. However, alternatively it is also conceivable that such intermediary or separate force transfer elements do exist. In particular, the gas volume is at least substantially sealed from the surrounding environment. It is conceivable that the gas volume has a small orifice that may have a changeable opening cross section or that may be open and closable in order to adjust a damping hardness of the damping unit depending on a controlled leakage of the gas volume in at least one damping direction or even in both damping directions.

Moreover, it is proposed that the damping unit is implemented as a linear dashpot. By this, an advantageous damping curve can be achieved. Furthermore, an advantageous noise reduction can be achieved. Moreover, a high longevity of the damping unit and with it the bi-stable solenoid device can be achieved. The linear damper is in particular configured to exert a force that acts opposite to a current translation movement of the armature.

When the damping unit, in particular the linear dashpot, is configured to dampen and/or to prevent the impact of the armature in two opposite movement directions of the armature, an effective and compact design of the damping unit can advantageously be achieved. In particular, the damping unit is configured to perform a push-pull-damping. Preferably the linear dashpot comprises at least a combination of a cylinder and a damping piston which is tightly, preferably gas-tightly, fit inside an inner space of the cylinder. It is conceivable that the piston has a controlled leakage allowing a controlled flow of gas between opposing sides of the damping piston. Preferably the cylinder is at least substantially sealed from the surrounding environment and a movement of the damping piston inside the cylinder causes a compression and/or expansion of the gas located inside the inner space of the cylinder. The cylinder preferably implements a damping chamber of the linear dashpot.

It is further proposed that the armature comprises a connecting rod, which in all possible operating states, in particular of the bi-stable solenoid device or a valve with the bi-stable solenoid device, extends into the cylinder of the damping unit. By this, an advantageous direct force transmission from the armature to the damping unit can be achieved. Furthermore, an advantageously simple and low-complexity construction of both, the armature and the damping unit can be achieved. In particular, the connecting rod also serves as a guide unit for guiding the linear movement of the armature within the bi-stable solenoid device. The connecting rod may be implemented as a, preferably non-magnetic, metal or plastics rod. Preferably the connecting rod has a cylinder-shape or a square-bar-shape. Preferably, the connecting rod is located at least partly inside a coil opening of a coil of the bi-stable solenoid device. Preferably, the connecting rod is at least partly protruding from the inside of the coil opening of the coil of the bi-stable solenoid device. In particular the protruding section of the connecting rot reaches inside the cylinder of the damping unit. In particular, the connecting rod is movable inside the cylinder of the linear dashpot. In particular, the damping piston of the linear dashpot is attached to the connecting rod.

When the damping unit comprises the damping piston, which is tightly fit into the cylinder of the damping unit and which is fixed to the connecting rod or, in particularly monolithically, formed at least partly, preferably completely, in one piece with the connecting rod, an advantageous direct force transmission from the armature to the damping unit can be achieved. Furthermore, an advantageously simple and low-complexity construction of both, the armature and the damping unit can be achieved. In particular the damping piston is implemented as a disc with its disk surface being arranged perpendicularly to an axial direction of the connecting rod.

In addition, it is proposed that the connecting rod carries at least one magnet element, which is participating in the generation of the movement of the armature. Thus, an advantageous direct force transfer between the driving force of the solenoid and the damping force of the damping unit can be achieved. Advantageously a very effective and low-complexity construction can be achieved. In particular, the coil of the bi-stable solenoid device is fixedly arranged. In particular, the connecting rod is movably arranged with respect to the fixed coil of the bi-stable solenoid device. Preferably, by being attached to the movably arranged connecting rod, the magnet unit is also movably arranged. The magnet unit interacts with the magnetic fields generated by the coil and thus a magnetic force is generated which drives a movement of the magnet unit and in turn the connecting rod. The magnet unit preferably is located at least partly or completely within the opening of the coil at all possible operating states of the solenoid valve device.

When the magnet element is a permanent magnet of a moving magnet actuator, a simple and cost-effective construction of the bi-stable solenoid device can be achieved. Preferably, the permanent magnet is magnetized in a direction parallel to an axial direction of the connecting rod and/or of the coil of the bi-stable solenoid device. However, other deviating magnetizations of the permanent magnet are conceivable. In particular, the permanent magnet has an at least substantially cylindrically-shaped outer contour. In particular, the permanent magnet surrounds the connecting rod in its circumferential direction completely. A moving magnet actuator in particular is a type of electromagnetic linear actuator consisting of an arrangement of a permanent magnet and coil, arranged in a way that currents in the coil generate a pair of equal and opposite forces between the coil and the permanent magnet, so that the magnet is actuated while the coil stays still.

Furthermore, it is proposed that the connecting rod carries at least one poppet or is translationally coupled to at least one poppet. Thus, advantageously an as direct a transmission of an actuating force to a valve element as possible can be achieved. It is conceivable that the poppet is at least partially implemented in one piece/monolithically with the connecting rod.

In addition, it is proposed that the bi-stable solenoid device comprises at least one position sensing element, which is configured to determine a current setting position of the armature. By this advantageously an operation monitoring can be achieved, which in particular is simple and reliable.

When the position sensing element is configured to determine the current setting position of the armature via a remote sensing of the damping piston, an advantageously constructively simple and non-invasive operation monitoring can be achieved. In particular, the position sensing element is arranged outside the coil, outside the magnet unit and/or outside the linear dashpot, in particular outside the cylinder of the linear dashpot. In particular, the remote sensing element is configured to sense the damping piston through walls of the cylinder of the linear dashpot. In particular the position sensing element is configured to determine a position, preferably an axial position, of the damping piston within the cylinder. From the knowledge about the current position of the damping piston the position of the armature, in particular the magnet element and/or the poppet can be determined. The position sensing element may comprise a computing unit or be in communication with an external computing unit in order to analyze the position sensing element's data. The computing unit in particular comprises a processor and a memory which stores a program that can be executed using the processor.

It is additionally proposed that the damping piston comprises a feedback magnet to facilitate the remote sensing of the damping piston by the position sensing element. Thus, advantageously an operation monitoring can be achieved, which in particular is simple and reliable. Furthermore, a compact and low-complexity construction of the bi-stable solenoid unit can be achieved. The feedback magnet preferably is implemented as a permanent magnet. The feedback magnet may be a smaller magnet that is integrated into the damping piston or may even form the damping piston to a large extent.

If the position sensing element is implemented as a Hall effect sensor, a reliable and simple implementation of the position sensing element can be achieved. A Hall effect sensor in particular is a type of sensor which detects the presence and magnitude of a magnetic field using the so-called Hall effect. In particular an output voltage of a Hall effect sensor is directly proportional to a strength of the sensed field, in particular the sensed field strength of the feedback magnet. The Hall effect sensor is in particular operated in a position sensing operating mode. In particular the cylinder softens armature impacts on the end stops as the armature reaches full stroke and in addition doubles as position feedback.

Moreover, a moving magnet actuator with the bi-stable solenoid device and a valve, in particular a latching valve, with the moving magnet actuator are proposed. By this, advantageous characteristics regarding a longevity and/or a structural integrity of the moving magnet actuator and/or of the valve can advantageously be achieved. The valve may be implemented as a (latching) poppet valve or a different latching valve. Preferably, the moving magnet actuator and/or the valve are configured for an application within a thermal management device in battery electric vehicles, wherein a current draw in rest states should advantageously be minimized.

In addition, a method for operating the bi-stable solenoid device, wherein in at least one method step an impact of the armature on at least one of the end stops, preferably on both of the end stops, is dampened and/or prevented by the damping unit, which is in communication with the armature, via a compression and/or an expansion of a gas volume, in particular of a gas within the gas volume. By this method, advantageous characteristics regarding a longevity and/or a structural integrity of the bi-stable solenoid device can advantageously be achieved.

The bi-stable solenoid device according to the invention, the moving magnet actuator according to the invention, the valve according to the invention and the method for operating the bi-stable solenoid device according to the invention are herein not to be restricted to the applications and implementation forms described above or pictured below. In particular, to fulfill a functionality herein described, the bi-stable solenoid device according to the invention, the moving magnet actuator according to the invention, the valve according to the invention and the method for operating the bi-stable solenoid device according to the invention may comprise a number of respective elements and/or structural components and/or units and/or method steps that differ/s from a number herein mentioned.

DRAWINGS

Further advantages will become apparent from the following description of the drawings. In the drawings, one exemplary embodiment of the invention is depicted. The drawings, the description and the claims contain a plurality of features in combination. Someone skilled in the art will purposefully also consider the features separately and will find further expedient combinations.

Figure 2:
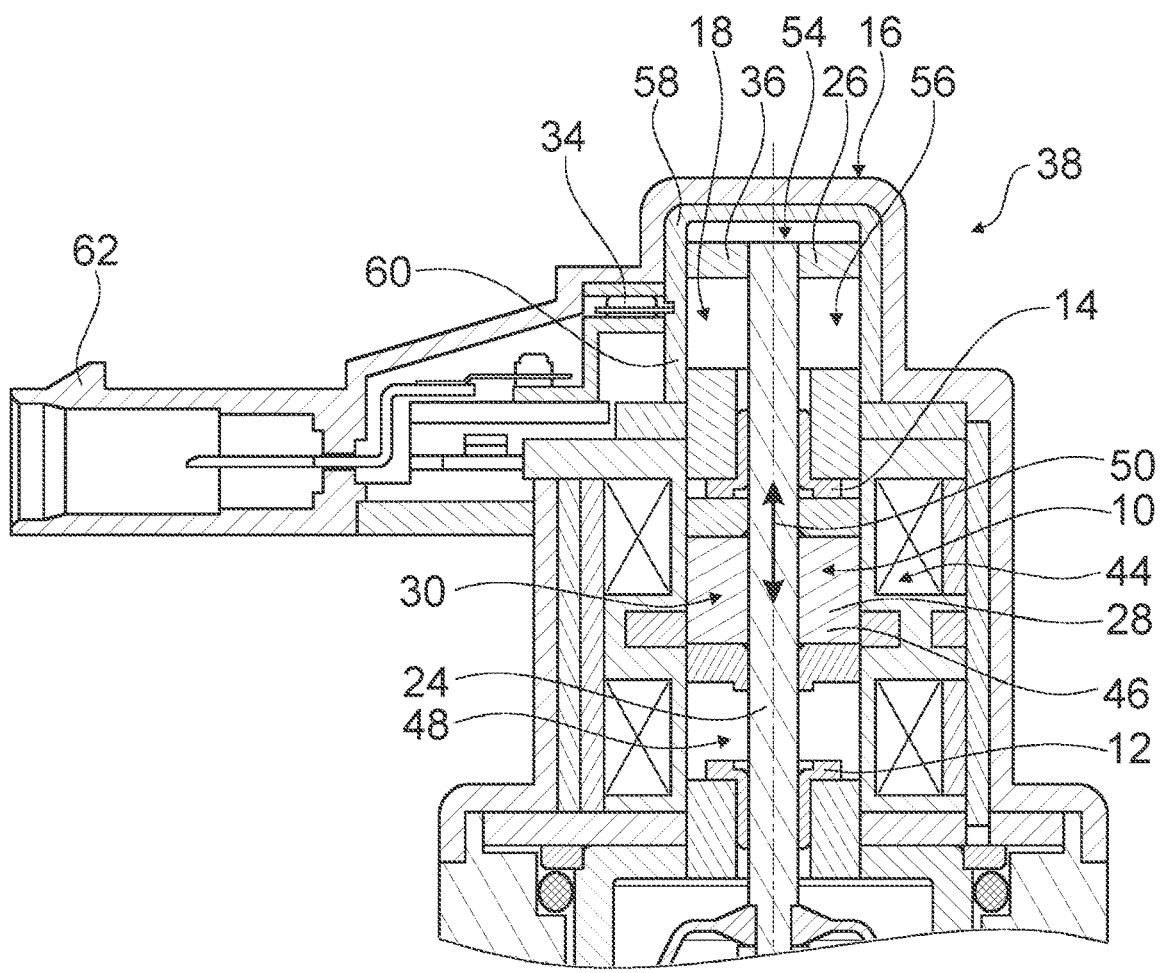
Figure 3:
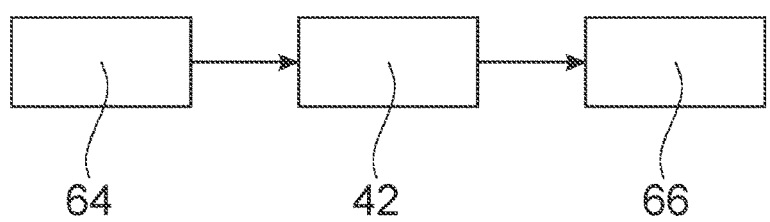

It is shown in:

FIG. 1 a schematic cross-section of a valve with a moving magnet actuator comprising a bi-stable solenoid device, FIG. 2 a schematic close-up of the bi-stable solenoid device and FIG. 3 a schematical flowchart for a method for operating the bi-stable solenoid device.

DESCRIPTION OF THE EXEMPLARY EMBODIMENT

The FIG. 1 shows a schematic cross-section of a valve 40. The valve 40 is implemented as a poppet valve, comprising at least one poppet 32. In the example shown in FIG. 1 the poppet valve comprises two poppets 32, 32', each of which is intended to open and close an opening of a respective valve seat 52, 52'. An application of the invention within different valve types however is conceivable. The valve 40 comprises a moving magnet actuator 30. The moving magnet actuator 30 comprises a coil arrangement 44. In the example of FIG. 1 the coil arrangement 44 comprises two coils. Alternatively, the coil arrangement 44 could also comprise more or less than two coils. The coil arrangement 44 is configured to produce a magnetic field when the coils are flowed through by an electric current. The coil arrangement 44 is statically/unmovably arranged within the moving magnet actuator 30. The coils of the arrangement 44 are statically/unmovably arranged within the moving magnet actuator 30. The moving magnet actuator 30 comprises a permanent magnet 46. The permanent magnet 46 is arranged within an opening 48 of the coil arrangement 44. The permanent magnet 46 is movably arranged within the opening 48 of the coil arrangement 44. The permanent magnet 46 is magnetized along an axial direction 50 of the moving magnet actuator 30. The permanent magnet 46 is movable along the axial direction of the moving magnet actuator 30. The permanent magnet 46 is configured to interact with the magnetic field generated by the coil arrangement 44. The magnetic field produced by the coil arrangement 44 pushes and or pulls the permanent magnet 46 up and/or down the axial direction 50. The moving magnet actuator 30 comprises an armature 10. The permanent magnet 46 is arranged within the armature 10. The armature 10 is at least partly implemented by the permanent magnet 46. The moving magnet actuator 30 comprises end stops 12, 14. The end stops 12, 14 are arranged along the axial direction 50. The end stops 12, 14 restrict a movement of the armature 10 within the moving magnet actuator 30. The armature 10 is movable between the end stops 12, 14.

The valve 40 is implemented as a bi-stable valve or as a latching valve. The end stops 12, 14 represent the stable positions of the valve 40. The moving magnet actuator 30 comprises a bi-stable solenoid device 38. FIG. 2 shows a schematic close-up of the bi-stable solenoid device 38. The bi-stable solenoid device 38 comprises the armature 10. The armature 10 is linearly movable between the two opposite end stops 12, 14. The armature 10 comprises a connecting rod 24. The connecting rod 24 extends along the axial direction 50. The connecting rod 24 is movably arranged. The connecting rod 24 is movably arranged within the coil arrangement 44. The armature 10 is fixedly attached to the connecting rod 24.

Alternatively or additionally the connecting rod 24 implements at least a part of the armature 10. The permanent magnet 46 is fixedly attached to the connecting rod 24. The bi-stable solenoid device 38 comprises a magnet element 28. The connecting rod 24 carries the magnet element 28. The magnet element 28 is participating in the generation of the movement of the armature 10. The magnet element 28 is the permanent magnet 46 of the moving magnet actuator 30. The connecting rod 24 is translationally coupled to the poppets 32, 32'. Alternatively, the connecting rod 24 could carry the poppets 32, 32' directly.

The bi-stable solenoid device 38 comprises a damping unit 16. The damping unit 16 is configured to dampen and/or to prevent an impact of the armature 10 on at least one of the end stops 12, 14. The damping unit 16 is configured to dampen and/or to prevent the impact of the armature 10 on the respective opposite end stops 12, 14 in two opposite movement directions 20, 22 of the armature 10. The damping unit 16 is configured to dampen and/or to prevent the impact of the armature 10 on the end stops 12, 14 by a compression and/or an expansion of a gas volume 18.

The damping unit 16 is implemented as a linear dashpot. The damping unit 16 comprises a cylinder 58. The cylinder 58 implements a damping pot of the linear dashpot. The damping unit 16 comprises a damping piston 26. The damping piston 26 is tightly fit into the cylinder 58 of the damping unit 16. A movement of the damping piston 26 within the cylinder 58 causes the compression or the expansion of the gas volume 18 depending on its movement direction. The damping piston 26 separates the gas volume of the cylinder 58 in two sub-volumes 54, 56. Each of the sub-volumes 54, 56 is intended to dampen the movement of the armature 10 in one of the two movement directions 20, 22.

The damping unit 16 is in communication with the armature 10. The damping unit 16 is in communication with the connecting rod 24. The connecting rod 24 connects the movement of the armature 10 to the damping unit 16. The connecting rod 24 extends in all possible operating states into the cylinder 58. A movement of the armature 10 causes a movement of the connecting rod 24 within the cylinder 58. The damping piston 26 is fixed to the connecting rod 24. It is also conceivable that the damping piston 26 is at least partly formed in one piece with the connecting rod 24. A movement of the connecting rod 24 causes a movement of the damping piston 26 within the cylinder 58. The movement of the damping piston 26 within the cylinder causes the compression or expansion of the sub-volumes 54, 56 of the gas volume 18 within the cylinder 58.

The bi-stable solenoid device 38 comprises a position sensing element 34. The position sensing element 34 is configured to determine a current setting position of the armature 10. The position sensing element 34 is configured to determine a current latching position of the armature 10. The position sensing element 34 is configured to determine a current stable state of the valve 40. The position sensing element 34 is configured to determine the current setting position of the armature 10 (or the current latching position of the armature 10 or the current stable state of the valve 40) via a remote sensing of the damping piston 26. The position sensing element 34 is implemented as a Hall effect sensor. The position sensing element 34 is arranged outside of the linear dashpot. The position sensing element 34 is arranged outside of and in proximity to an outer wall 60 of the cylinder 58. The position sensing element 34 is arranged in proximity to an outer mantle surface of the cylinder 58. The damping piston 26 comprises a feedback magnet 36. The feedback magnet 36 is integrated into the damping piston 26 or attached to the damping piston 26 or implemented by the damping piston 26. The feedback magnet 36 is configured to facilitate the remote sensing of the damping piston 26 by the position sensing element 34. The feedback magnet 36 is configured to interact with the position sensing element 34 in order to determine the position of the damping piston 26, hence the position of the armature 10.

The valve 40 comprises a connecting element 62, which is at least configured to provide an electrical and data-transfer contact point for contacting the position sensing element 34.

The FIG. 3 shows a schematical flowchart for a method for operating the bi-stable solenoid device 38. In at least one method step 64, the armature 10 is accelerated and moved out of a stable position at an end stop 12 towards the other end stop 14. In at least one further method step 42, the impact of the armature 10 on the end stop 14 is dampened and/or prevented by the damping unit 16 via a compression of a gas within one of the sub-volumes 54 of the gas volume 18. Subsequently the stable position at this end stop 14 is assumed by the armature 10. In at least one further method step 66 the same procedure is performed in the opposite direction towards the other end stop 12 by compressing the other sub-volume 56 of the gas volume 18. Subsequently the other stable position at this other end stop 12 is assumed by the armature 10.

REFERENCE NUMBERS

10 Armature
12 End stop
14 End stop
16 Damping unit
18 Gas volume
20 Movement direction
22 Movement direction
24 Connecting rod
26 Damping piston
28 Magnet element
30 Moving magnet actuator
32 Poppet
34 Position sensing element
36 Feedback Magnet
38 Bi-stable solenoid device
40 Valve
42 Method step
44 Coil arrangement
46 Permanent magnet
48 Opening
50 Axial direction
52 Valve seat
54 Sub-volume
56 Sub-volume
58 Cylinder
60 Wall
62 Connecting element
64 Method step
66 Method step

The invention claimed is:

1. A bi-stable solenoid device, comprising
an armature, which is linearly movable between two opposite end stops; and
a damping unit, which is in communication with the armature and which is configured to dampen and/or to prevent an impact of the armature on at least one of the end stops by a compression and/or an expansion of a gas volume,
wherein the armature comprises a connecting rod, which in all possible operating states, extends into a cylinder of the damping unit, and
wherein the damping unit comprises a damping piston, which is gas-tightly fit into the cylinder of the damping unit, and which is fixed to the connecting rod or at least partly formed in one piece with the connecting rod.

2. The bi-stable solenoid device according to claim 1, wherein the damping unit is implemented as a linear dashpot.

3. The bi-stable solenoid device according to claim 1, wherein the damping unit is configured to dampen and/or to prevent the impact of the armature in two opposite movement directions of the armature.

4. The bi-stable solenoid device according to claim 1, wherein the connecting rod carries at least one permanent magnet of a moving magnet actuator, which is participating in the generation of the movement of the armature.

5. The bi-stable solenoid device according to claim 1, wherein the connecting rod carries at least one poppet or is translationally coupled to at least one poppet.

6. The bi-stable solenoid device according to claim 1, further comprising
at least one position sensing element, which is configured to determine a current setting position of the armature.

7. The bi-stable solenoid device according to claim 6, wherein the position sensing element is configured to determine the current setting position of the armature via a remote sensing of the damping piston.

8. The bi-stable solenoid device according to claim 7, wherein the damping piston comprises a feedback magnet to facilitate the remote sensing of the damping piston by the position sensing element.

9. The bi-stable solenoid device according to claim 8, wherein the position sensing element is implemented as a Hall effect sensor.

10. A moving magnet actuator with
the bi-stable solenoid device according to claim 1.

11. A valve with
the moving magnet actuator according to claim 10.

12. A method for operating the bi-stable solenoid device according to claim 1,
wherein in at least one method step, the impact of the armature on the at least one of the end stops is dampened and/or prevented by the damping unit, which is in communication with the armature, via the compression and/or the expansion of the gas volume.

* * * * *